Jan. 10, 1928.

C. C. LAURITSEN 1,655,553

RECEIVING APPARATUS FOR ELECTROMAGNETIC WAVES

Filed May 9, 1923

INVENTOR
Charles C. Lauritsen
BY E. E. Huffman
ATTORNEY

Patented Jan. 10, 1928.

1,655,553

UNITED STATES PATENT OFFICE.

CHARLES C. LAURITSEN, OF ST. LOUIS, MISSOURI, ASSIGNOR TO WAGNER ELECTRIC CORPORATION, OF ST. LOUIS, MISSOURI, A CORPORATION OF DELAWARE.

RECEIVING APPARATUS FOR ELECTROMAGNETIC WAVES.

Application filed May 9, 1923. Serial No. 637,641.

REISSUED

It is a well known fact that the simple receiving apparatus now in common use in radio telephony, (for example receiving sets of the single circuit type) lack, to a great extent, the desirable property of selecting a desired signal to the exclusion of signals of other frequencies. Also a great deal of annoying interference with reception on nearby receiving sets is caused by radiation from tube receiving sets when regeneration, or what is commonly known as the "feed-back" circuit is employed.

One of the objects of this invention is to secure sharp tuning and consequent elimination or reduction of undesired signals and other "interference" by simple means requiring minimum adjustments.

A further object and advantage of the invention is to prevent, or so decrease radiation from tube receiving sets as to eliminate interference between adjacently located sets.

The objects of my invention are accomplished without making it ncessary to depart from the antenna height and dimensions most suitable for the collection of sufficient signal energy.

Figure 1:
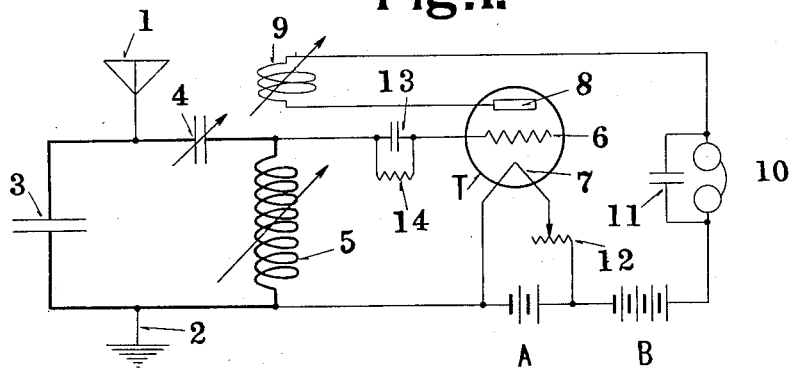
Figure 2:
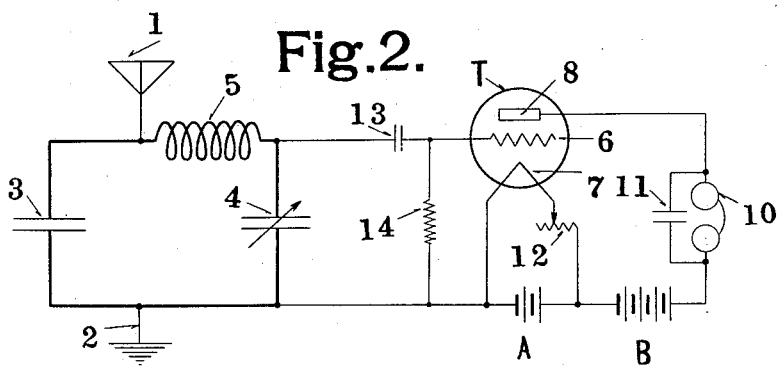
Figure 3:
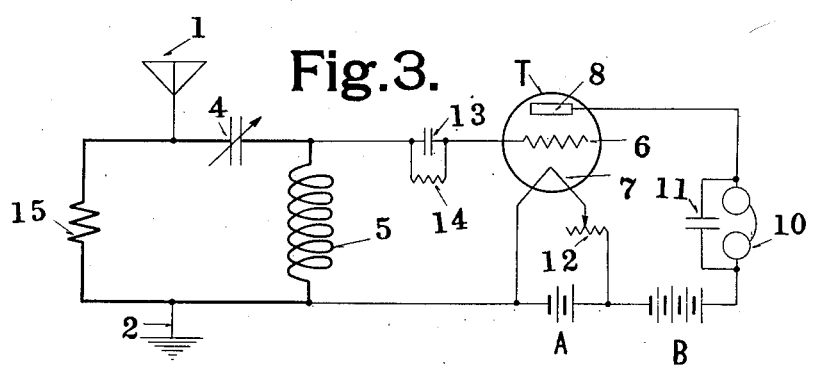

In the accompanying drawings Figure 1 diagrammatically illustrates receiving apparatus of the regenerative type embodying my invention; Figure 2 illustrates a modification of the arrangement shown in Figure 1, regeneration being omitted, and Figure 3 shows another modification, also without regeneration.

Referring to Figure 1 the collector system comprises the antenna 1 and ground connection 2, which are connected as shown to a closed oscillatory circuit comprising the condenser 3 of comparatively large capacity, the condenser 4, and the inductance 5. As shown, the connections of the antenna and ground to this closed oscillatory circuit are so located that the circuit has two branches between the antenna and ground connections, one containing the capacity 3, and which is hereinafter referred to as the "by-pass" branch, and the other the capacity 4 and inductance 5, hereinafter referred to as the "signal receiving" branch.

The vacuum tube T has its grid electrode 6 and filament electrode 7 directly connected to points on the signal receiving circuit on opposite sides of the inductance 5, whereby the drop of signal potential across the inductance is impressed upon the grid circuit of the tube. This grid circuit may, as is common practice, include the grid condenser 13 and grid leak 14. Filament current is supplied from battery A controlled by rheostat 12. The plate circuit of the tube comprises battery B, telephones 10 shunted by condenser 11, tickler coil 9 in inductive relation with coil 5, and the plate electrode 8 of the tube.

The circuits illustrated in Figure 2 differ from those of Figure 1 only in that the tickler coil 9 is omitted from the plate circuit and the grid circuit of the tube is connected across the terminals of the capacity 4 of the closed oscillatory circuit in the collector system instead of across the inductance 5.

The circuits of Figure 3 correspond to those of Figure 1 except in the omission of the tickler coil 9 and the substitution of resistance or inductance 15 for condenser 3 in the oscillatory circuit.

It will be understood that while, in the drawings the detector circuit is shown directly connected to the collector system, one or more stages of amplification may be employed prior to detection, the grid circuit of the first amplifying tube being connected to the collector system in the same manner as the detector circuits are connected in the illustrations.

The elements of the closed oscillatory circuit in the collector system are proportioned to produce a stiff circuit, the resistance being low and the ratio of inductance to capacity being high. A suitable value for the inductance is 250 milli-henrys, and that for condenser 3 is .001 microfarad. The capacity of condenser 4 is variable and a suitable maximum value is .0003 microfarad. The value normally employed will of course be less than the maximum, and it is preferable that the maximum capacity of 4 be less than that of 3.

By adjustment of the variable condenser 4, or the inductance 5, or both, the oscillatory circuit is rendered resonant to the desired signal wave length and is capable of being made resonant to what are usually referred to as short wave lengths, that is to say, of 600 meters and shorter. Being a stiff circuit a given adjustment of the condenser 4 renders the circuit resonant to an extremely narrow band of frequencies and the condenser 3 acts as a by-pass from antenna to ground for all other frequencies. As indicated in Figure 3 a resistance or an inductance may be substituted for the capacity in the by-pass branch. In the claims these three classes of elements are referred to as "impedance." I prefer to use a condenser in the by-pass branch because of its inherent characteristic of offering a lower resistance to higher frequencies, such as 200 meter spark waves and certain types of static.

When regeneration is employed as indicated in Figure 1 only a small portion of the oscillatory energy produced will be radiated from the antenna, on account of the fact that the generated E. M. F. is so distributed in the oscillatory circuit that only a small part of same is impressed between the antenna and ground. This is due to the fact that the capacity of condenser 4 is in series with the parallel combination of the antenna to ground capacity and the capacity 3. The capacity of this parallel combination is high compared to the capacity of the condenser 4. The total E. M. F. in the oscillatory circuit (whether produced by regeneration or not) is always divided between these capacities in series, and since this division is in inverse proportion to their values, the E. M. F. applied between antenna and ground will be only a small fraction of the total E. M. F. in the circuit. The amount of energy radiated from the antenna will, therefore, be proportionately small, and as this is equivalent to reducing the radiation resistance, the selectivity of the system is improved. Tests have shown that the amount of energy radiated from my receiving apparatus is less than one-fifteenth as great as that radiated under similar conditions by the ordinary single circuit regenerative receivers. The result is that receiving apparatus constructed in accordance with my invention will not create the disturbing beat-note and other noises in near-by receiving sets even though it is used with regeneration and even with the tube oscillating.

It will be understood that the connection of the antenna and ground to the closed circuit results in there being the equivalent of a capacity in parallel with capacity 3, so far as tuning is concerned, and will very slightly influence the tuning, and that where reference is made in the description and claims to adjusting the closed oscillatory circuit to resonance with signals of the frequency to be received, I mean that the elements of this circuit are so adjusted that in cooperation with the above factor a tuned system is produced which is resonant to signals of the frequency to be received. In other words, this antenna to ground capacity constitutes a part of the capacity of the closed oscillatory circuit from the standpoint of the tuning referred to.

I am aware that modifications in the type of capacity and other elements herein illustrated and described may be made without departing from my invention and I do not therefore intend that its scope be limited otherwise than by the appended claims.

Having fully described my invention, what I claim as new and desire to secure by Letters Patent of the United States is:

1. Receiving apparatus for electromagnetic waves comprising a collector circuit and a closed oscillatory circuit connected in the collector circuit in such manner that one portion of the oscillatory circuit constitutes a by-pass branch, and the other portion a signal receiving branch, the by-pass branch containing impedance, and the signal receiving branch containing inductance and capacity elements adjusted to render the oscillatory circuit resonant to signals of the frequency to be received, the impedance of the capacity element of the signal receiving branch to said signal current being of higher value than the impedance in the by-pass branch, and means associated with the signal receiving branch for detecting the received signals.

2. Receiving apparatus for electromagnetic waves comprising a collector circuit and a closed oscillatory circuit connected in the collector circuit in such manner that one portion of the oscillatory circuit constitutes a by-pass branch and the other portion a signal receiving branch, the by-pass branch containing impedance, and the signal receiving branch containing inductance and capacity elements adjusted to render the oscillatory circuit resonant to signals of the frequency to be received, the impedance of the capacity element of the signal receiving branch to said signal current being of higher value than the impedance in the by-pass branch, and a signal amplifying or detecting circuit connected to points on the signal receiving branch between which there is a difference of signal potential.

3. Receiving apparatus for electromagnetic waves comprising a collector circuit and a closed oscillatory circuit connected in the collector circuit in such manner that one portion of the oscillatory circuit constitutes a by-pass branch and the other portion a signal receiving branch, the signal receiving branch containing inductance and capacity elements adjusted to render the oscillatory circuit resonant to signals of the frequency to be received, and the by-pass branch being constituted to offer to waves of frequencies other than the frequency to be received a lower impedance path than exists through the signal receiving branch, and means associated with the signal receiving branch for detecting the received signals.

4. A receiving apparatus for electromagnetic waves comprising an antenna, a closed oscillatory circuit comprising an inductance, a condenser and an impedance all in series, said closed circuit being connected to the antenna at a point between the condenser and said impedance and to ground at a point between the inductance and said impedance, whereby a collector circuit is formed comprising a signal receiving branch containing the inductance and the condenser and a by-pass branch containing the impedance, the impedance of the by-pass branch to said signal currents of any frequency within the receiving range of the apparatus being of lower value than the impedance to said signal current offered by the combination of the antenna to ground capacity and the capacity of the condenser in the signal receiving branch, and signal receiving means associated with the signal receiving branch.

5. A receiving apparatus for electromagnetic waves comprising an antenna, a closed oscillatory circuit comprising an inductance, a condenser and an impedance all in series, said closed circuit being connected to the antenna at a point between the condenser and said impedance and to ground at a point between the inductance and said impedance, whereby a collector circuit is formed comprising a signal receiving branch containing the inductance and the condenser and a by-pass branch containing the impedance, the impedance of the by-pass branch to signal currents of any frequency within the receiving range of the apparatus being of lower value than the impedance to said signal current offered by the combination of the antenna to ground capacity and the capacity of the condenser in the signal receiving branch, and signal receiving means associated with the signal receiving branch, said means comprising a device capable of producing electrical oscillations in the aforesaid closed oscillatory circuit.

In testimony whereof, I have hereunto set my hand.

CHAS. C. LAURITSEN.